(12) United States Patent
Kitajima et al.

(10) Patent No.: US 6,397,585 B2
(45) Date of Patent: Jun. 4, 2002

(54) CATALYST TEMPERATURE ESTIMATING APPARATUS

(75) Inventors: Shinichi Kitajima; Atsushi Matsubara; Shigetaka Kuroda; Takashi Iwamoto, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/735,482

(22) Filed: Dec. 14, 2000

(30) Foreign Application Priority Data

Dec. 17, 1999 (JP) ............................. 11-359792

(51) Int. Cl.[7] ................................. F01N 3/00
(52) U.S. Cl. ........................... 60/284; 60/299
(58) Field of Search .................. 60/274, 284, 299, 60/285

(56) References Cited

U.S. PATENT DOCUMENTS

| 5,444,976 A | * | 8/1995 | Gonze et al. | ................. 60/284 |
| 5,727,384 A | * | 3/1998 | Ma | ................. 60/284 |
| 5,729,971 A | * | 3/1998 | Matsuno et al. | ................. 60/276 |
| 5,771,690 A | * | 6/1998 | Kakizaki et al. | ................. 60/277 |
| 5,845,486 A | * | 12/1998 | Yamashita et al. | ................. 60/284 |
| 5,881,552 A | * | 3/1999 | Iwata et al. | ................. 60/284 |
| 6,073,440 A | * | 6/2000 | Douta et al. | ................. 60/284 |

FOREIGN PATENT DOCUMENTS

| JP | A-10-205375 | 8/1998 |
| JP | A-2000-257463 | 9/2000 |

* cited by examiner

*Primary Examiner*—Thomas Denion
*Assistant Examiner*—Diem Tran
(74) *Attorney, Agent, or Firm*—Arent Fox Kintner Plotkin & Kahn, PLLC

(57) ABSTRACT

A catalyst temperature estimating apparatus is provided, capable of estimating the temperature of the catalyst installed in an internal combustion engine on a vehicle by providing various catalyst temperature estimating parameters, when the internal combustion engine is in an idle stop. When it is determined that the internal combustion engine is stopped by determining whether the internal combustion engine is stopped, the temperature of the catalyst is estimated based on temperature coefficients during the engine stop. Estimation of the catalyst temperature even when the engine is in an idle stop makes it possible to accurately and promptly estimate the catalyst temperature when the engine is restarted from the idle stop.

2 Claims, 5 Drawing Sheets

US 6,397,585 B2

CATALYST TEMPERATURE ESTIMATING APPARATUS

BACKGROUND OF THE INVENTION

1. Field of the Invention

The present invention relates to a catalyst temperature estimating apparatus for estimating the catalyst temperature installed in the exhaust system of an internal combustion engine, and particularly relates to a catalyst temperature estimating apparatus capable of estimating the catalyst temperature even when the internal combustion engine is stopped.

2. Background Art

Recently, in order to improve fuel consumption and to reduce the emission of noxious components, an automatic starting and stopping apparatus has been proposed, which automatically stops the engine under certain driving conditions, and automatically starts the engine when the driver conducts a starting operation of the vehicle. An example of this automatic starting and stopping apparatus stops the engine when the engine is in idling operation, and the brake pedal is depressed, and the shift position of the transmission is at neutral position, and the vehicle speed is zero (hereinafter, this engine stop state is called as idle stop).

Particularly, in the case of a hybrid vehicle provided with an electric motor together with an internal combustion engine as the driving power sources of the vehicle, since the internal combustion engine can be driven by the motor installed in the vehicle, the internal combustion engine once stopped can be restarted easily, and such an idle stop operation is adopted for hybrid vehicles.

In order to provide compatibility of protecting the catalyst installed in the exhaust system of the internal combustion engine and preserving the low fuel consumption rate, for example, Japanese Unexamined Patent Application, First Publication No. Hei 10-205375 proposes an apparatus to estimate the temperature of the catalyst installed in the exhaust system of the internal combustion engine and increases fuel supply when the load becomes high. However, the apparatus disclosed in the above Japanese Unexamined Patent Application, First Publication No. Hei 10-205375 estimates that the temperature of the catalyst became sufficiently lower and sets the estimated temperature to an initial value when the engine is stopped and restarted.

However, when the above-described conventional apparatus is applied to hybrid vehicles having the idle stop function, the estimated catalyst temperature is set at the low initial catalyst temperature even when the engine is restarted before the catalyst temperature falls to the level of the low initial temperature. As a result, the problems arise that the estimated catalyst temperature includes an error and that it takes time for the estimated temperature to catch up the actual catalyst temperature.

SUMMARY OF THE INVENTION

It is therefore an object of the present invention to provide a catalyst temperature estimating apparatus of the internal combustion engine, which carries out estimation of the catalyst temperature at every predetermined intervals by further providing parameters for calculating the catalyst temperature during the idle stop operation.

In order to attain the above object, a catalyst temperature estimating apparatus of the present invention comprises a driving state detection device (in the embodiment, the absolute pressure sensor 8 in an intake pipe, the engine coolant temperature sensor 10, the crank angle sensor 11, etc.) for detecting a driving state of an internal combustion engine (in the embodiment, the engine 1), a catalyst (in the embodiment, the three way catalyst 15) installed in the exhaust system (in the embodiment, the exhaust pipe 14) of the internal combustion engine, a temperature estimation apparatus (in the embodiment, step S19) for estimating a temperature of the catalyst based on the output of the driving state detecting device, and a determination device for determining whether the internal combustion engine is operating or stopping, wherein the temperature estimating device estimates the temperature of the catalyst based on predetermined values (in the embodiment, TCTMIS and CTCTIS) used at the time of the engine stop when it is determined by the determination device that the internal combustion engine is stopping.

Furthermore, the catalyst temperature estimating apparatus according to the first aspect is capable of executing an idle stop.

DETAILED DESCRIPTION OF THE INVENTION

Hereinafter, a catalyst temperature estimating device applied to a control device of a hybrid vehicle according to one embodiment of the present invention will be described with reference to the attached drawings.

In the following description, an explanation is first provided about conditions, under which the idle stop operation of an internal combustion engine is executed, and then the next explanation is provided about various processes executed by the catalyst temperature estimation apparatus of the internal combustion engine in response to various engine conditions such as the idle stop operation.

Figure 1:
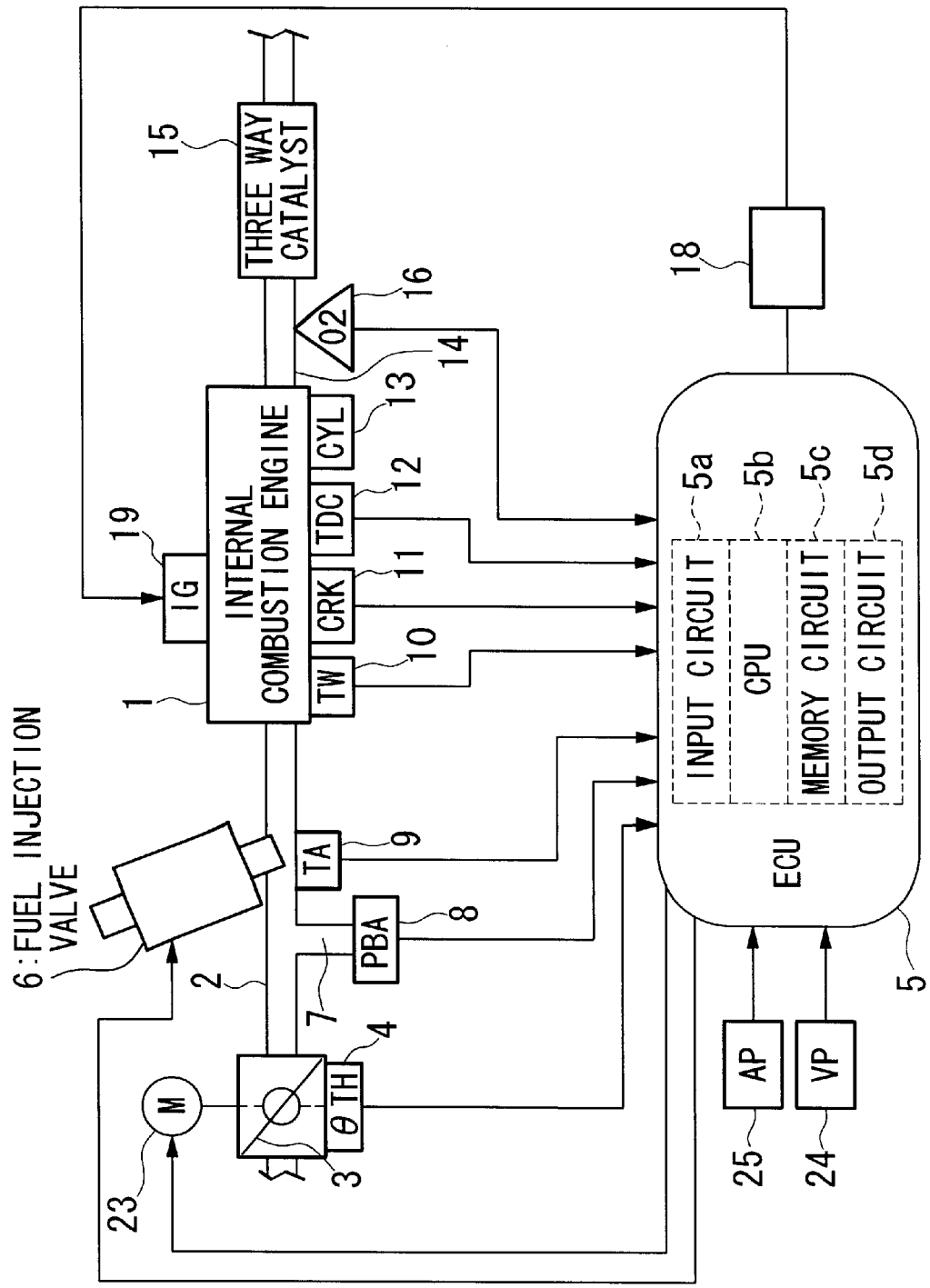
FIG. 1 is a block diagram showing the schematic structure of a internal combustion engine and a control device of the engine according to an embodiment of the present invention.

Referring first to FIG. 1, there is illustrated the whole arrangement of the internal combustion engine (hereinafter simply referred to as "the engine") and a fuel supply control system thereof according to an embodiment of the present invention.

In the figure, reference numeral 1 designates an internal combustion engine, which has a cylinder block to which is connected an intake pipe 2. A throttle valve 3 is arranged in the intake pipe 2. A throttle valve opening (TH) sensor 4 is connected to the throttle valve 3, and electrically connected to an electronic control unit (hereinafter, referred to as "the ECU") 5 for supplying an electric signal indicative of the sensed throttle valve opening TH to the ECU 5.

Further electrically connected to the ECU 5 are a throttle actuator 23 for driving the throttle valve 23 and an accelerator pedal position (AP) sensor 25 for detecting the position AP of an accelerator pedal, not shown, of a vehicle in which the engine is installed. The ECU 5 controls the operation of the throttle actuator 23 in response to the accelerator pedal position AP detected by the accelerator pedal position sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3 for sensing absolute pressure or intake pressure (PBA) within the intake pipe 2, and is electrically connected to the ECU 5 for supplying an electric signal indicative of the sensed absolute pressure PBA to the ECU 5. Further, an intake air temperature (TA) sensor 9 is inserted into the intake pipe at a location downstream of the PBA sensor 8 for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant for supplying an electric signal indicative of the sensed engine coolant temperature TW to the ECU 5.

A cylinder-discriminating sensor (hereinafter, referred to as "the CYL sensor") 13, a TDC sensor 12, and a crank angle (CRK) sensor 11 are arranged in facing relation to a crankshaft or a crankshaft of the engine 1, neither of which is shown. The CYL sensor 13 generates a signal pulse (hereinafter, referred to as "a CYL signal pulse") at a predetermined crank angle of a particular cylinder of the engine 1. The TDC sensor 12 generates a signal pulse (hereinafter, referred to as "a TDC signal pulse) at each of predetermined crank angles (e.g. whenever the crank shaft rotates through 180 degrees when the engine is of the 4-cylinder type) which each corresponds to a predetermined crank angle before a top dead point (TDC) of each cylinder corresponding to the start of the intake stroke of the cylinder. The CRK sensor 11 generates a signal pulse (hereinafter, referred to as "a CRK signal pulse) at one of predetermined crank angles (e.g. whenever the crank shaft rotates through 30 degrees) with a predetermined repetition period shorter than the repetition period of TDC signal pulses. The CYL signal pulse, TDC signal pulse, and CRK signal pulse are supplied to the ECU 5.

A spark plug 19 is arranged in each cylinder of the engine 1 and electrically connected to the ECU 5 through a distributor 18.

Further electrically connected to the ECU 5 are a vehicle speed sensor 24 for detecting the traveling speed (vehicle speed) VP of the vehicle and an atmospheric pressure sensor for detecting atmospheric pressure (PA). Signals indicative of the sensed vehicle speed VP and the atmospheric pressure PA are supplied to the ECU 5.

A three way catalyst (catalytic converter) 15 is arranged in an exhaust pipe 14 of the engine 1 for purifying noxious components of exhaust gases emitted from the engine 1, such as HC, CO, and NOx. An oxygen concentration sensor (hereinafter, referred to as "the $O_2$ sensor") 16 as an air-fuel ratio sensor is arranged in the exhaust pipe 14 at a location upstream of the catalyst 15, which detects the concentration of oxygen present in exhaust gases and supplies an electric signal indicative of the sensed oxygen concentration to the ECU 5.

Furthermore, the ECU 5 receives, in addition to the above-described information concerning the engine 1, information from component of the hybrid vehicle, such as each information from respective control devices for controlling a motor (not illustrated), a high voltage battery (not illustrated) for supplying electric power mainly to the motor, a 12V battery (not illustrated) for supplying power to the vehicle auxiliary accessories (for example, a state of charge of the battery, and the operating state of the motor). Based on above-described information and other parameters, the ECU 5 identifies the engine operating states such as a fuel cut, an idle stop, and the engine is starting, and also estimates the temperature of the three way catalyst and controls the fuel injection period of the fuel injection valve 6.

Next, among engine operating states determined by the engine ECU 5, the idle stop determination flow will be described hereinafter with reference to FIG. 2.

Figure 2:
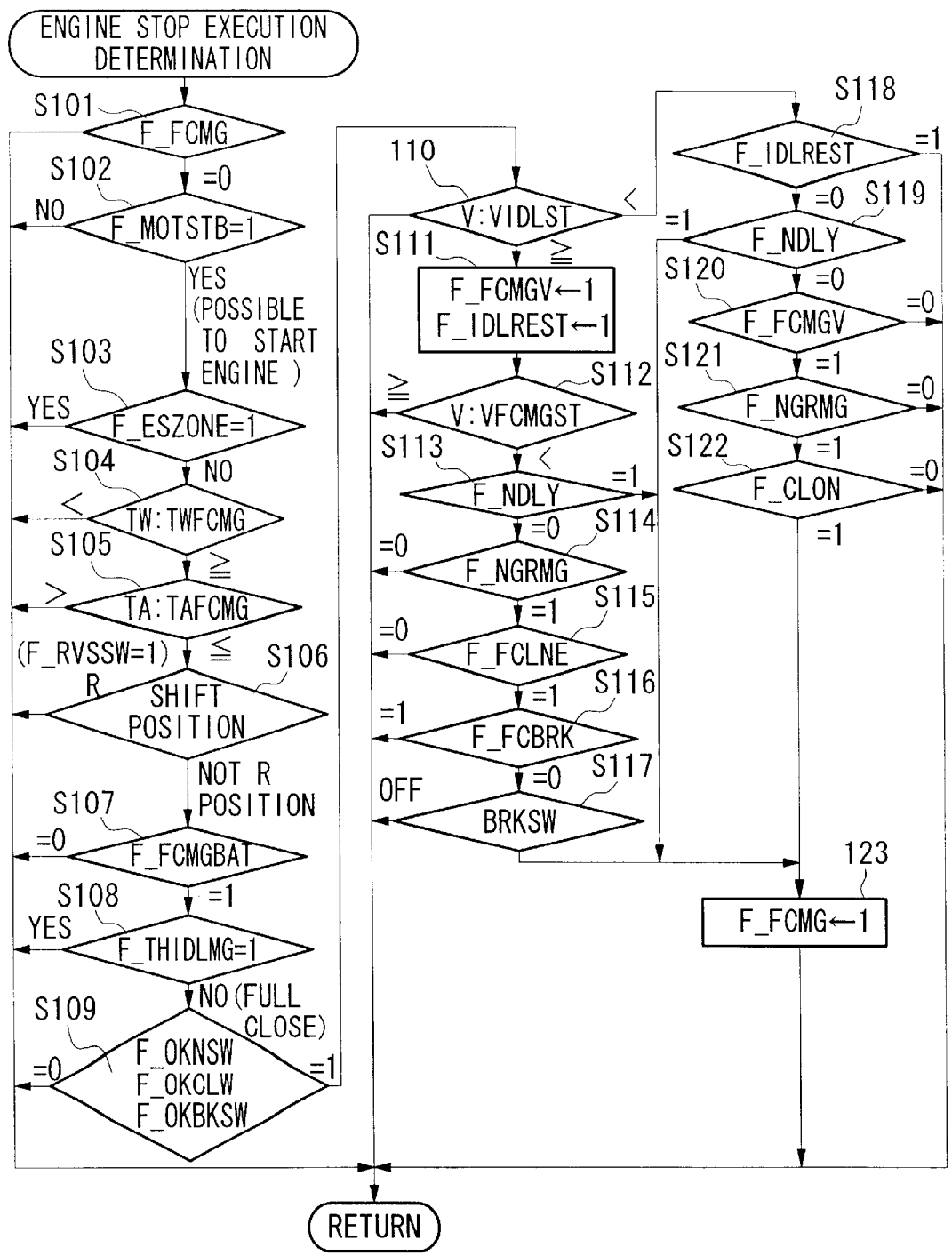
FIG. 2 is a flow-chart showing the engine stop execution determination flow according to the embodiment.

In step S101 in FIG. 2, the state of the engine stop control execution flag F_FCMG which indicates the idle stop execution is determined. When the engine stop control execution flag F_FCMG is "0", that is, when it is determined that the idle stop control is not executed, then the step proceeds to step S102, wherein it is determined whether the motor start propriety determination flag F_MOTSTB is "1" that is, it is determined whether the motor start is appropriate.

When it is determined that the motor start propriety determination flag F_MOTSTB is "1" that is, when it is determined the start by the motor is appropriate, the flow proceeds to step S103. In step S103, it is determined whether the energy storage zone determination flag F_ESZONE is "1", that is, it is determined whether the state of charge of the battery SOC is in the over-discharged region (for example, less than 20%).

When it is determined in step S103 that the energy storage determination flag F_ESZONE is "0", that is, the state of charge is not in the over-discharged zone, it is determined in the subsequent step S104 whether the present coolant temperature TW is equal to or higher than the lower limit coolant temperature TWFCMG (for example, 40° C.) for executing the engine stop.

When it is determined that the coolant temperature is equal to or higher than the lower limit coolant temperature TWCMG, that is, when TW≧TWCMG, it is determined in the subsequent step S105 whether the suction air temperature TA is less than the upper limit suction air temperature TAFCMG (for example, 40° C.). When it is determined that the suction air temperature is less than the upper limit suction air temperature for executing the engine stop, that is, when TA≦TAFCMG, the flow proceeds to step S106.

In step S106, it is determined whether the shift position is in a reverse R (back) position. When it is determined that a reverse switch flag F_RVSSW is "0", that is, when it is determined that the shift position is not the reverse position, the flow proceeds to step S107, wherein it is determined whether the restart possibility determination flag F_FCMGBAT is "1". When it is determined that the restart is possible, the flow proceeds to step S108.

In step S108, it is determined whether the throttle fill close determination flag F_THIDLMG is "1". When it is determined whether the throttle fill close determination flag F_THIDLMG is "0", that is, when it is determined that the throttle is fully closed, that flow proceeds to step S109.

In step S109, the states of a neutral switch OK flag F_OKNSW, a clutch switch OK flag F_OKCLSW, and a brake switch OK flag F_OKBRKSW are determined. The above-described flags are used for determining whether these switches are normally operating and when these switches are in normal conditions, these flags are set to "1". When it is determined that these switches are normal, the flow proceeds to step S110.

In step S110, the present vehicle speed is compared with an idle stop execution determination vehicle speed VIDLST (for example, 3 km/h). Because of this comparison, the fuel cut operation continues when the vehicle is moving (that is, after step S111), and when the vehicle is determined that it is stopping, the idle stop operation is executed. The above processes make it possible to improve the fuel consumption.

When it is determined that the vehicle speed V is lower than the idle stop execution determination vehicle speed VIDLST, the flow proceeds to step S118, wherein the state of a flag F_IDLREST for executing restart by opening throttle is determined. When it is determined that the flag F_IDLREST for executing restart by opening the throttle is "0", the flow proceeds to step S119. Instep S119, the state of the neutral gear position holding determination flag F_NDLY is determined. When it is determined that the neutral gear position holding determination flag F_NDLY is "0", that is, it is determined that the neutral gear position is not held for a predetermined period of time, the flow proceeds to step S120.

In step S120, the state of a flag F_FCMGV is determined for determining whether the vehicle speed exceeds a predetermined vehicle speed after restarting the starter. Here, the phrase "after restarting the starter" means that the vehicle is restarted (the same meaning below). When it is determined that the flag F_FCMGV for determining whether the vehicle speed exceeds a predetermined vehicle speed after restarting the starter is "1", the flow proceeds to step S121, and the state of a flag F-NGRMG for determining whether the gear positions excluding the first gear position are used is determined. When it is determined that the flag F_NGRMG for determining whether the gear positions excluding the first gear position are used is "1", that is, it is determined that the vehicle is moving using a gear position excluding the first position, the flow proceeds to step S122, wherein the state of the clutch pedal depression holding determination flag F_CLON is determined.

When it is determined that the clutch pedal depression holding determination flag F_CLON is "1", the flow proceeds to step S123, wherein an engine stop control execution flag F_FCMG is set to "1". Thereby, the engine stop is executed when the vehicle is stopped while the clutch pedal is depressed and shift position is not on the first or reverse gear positions.

In step S110, it is determined whether the present vehicle speed V is lower than the idle stop execution determination vehicle speed VIDLST, and when it is determined the present speed V is lower than the idle stop execution determination vehicle speed VIDLST, the flow proceeds to step S111, wherein a flag F_FCMGV, which indicates that the present vehicle speed exceeds a predetermined vehicle speed after starting the starter, is set to "1", and the flag F_IDLREST for executing restart by opening throttle is set to "0", then the flow proceeds to step S112.

In step S112, a comparison is made between the present vehicle speed V and the upper limit vehicle speed VFCMGST for continuing the fuel cut during deceleration (for example, 20 km/h). When it is determined that the present vehicle speed V is lower than the upper limit vehicle speed VFCMGST for continuing the fuel cut during deceleration, the flow proceeds to step S113, wherein the state of a neutral gear position holding determination flag F_NDLY is determined.

When it is determined that the neutral gear position holding determination flag F_NDLY is "1", the flow proceeds to step S123, wherein an engine stop control execution flag F_FCMG, which indicates that the engine stop can be executed, is set to "1". In contrast, when it is determined that the neutral gear position holding determination flag F_NDLY is "0", the flow proceeds to step S114. In step S114, the state of the flag F_NGRMG for determining whether the gear positions are not in the first gear position. When it is determined that the flag F_NGRMG for determining whether the gear positions is not in the first gear position is used, is "1", the flow proceeds to step S115, wherein the state of a low engine rotation speed determination flag F_FCLINE at the time of depressing the clutch is determined.

When the flag F_FCLINE, which indicates the result of the comparison between the engine rotation speed NE at the time of depressing the clutch pedal with a predetermined value, is "1", that is, when the clutch is disconnected when the engine rotation speed NE is lower than a predetermined engine rotation speed NE, the fuel cut during deceleration is continued, and in subsequent step S116, the state of the flag F_FCBRK, which indicates that the brake is not depressed while continuing the fuel cut during deceleration, is determined.

In step S116, when the flag F_FCBRK, which indicates that the brake is not depressed while continuing the fuel cut during deceleration, is "0", it is determined in step S117 whether the brake switch is "ON" or "OFF". When it is determined that the brake switch is "ON", the flow proceeds to step S123, wherein the engine stop control execution flag F_FCMG which indicates that the idle stop can be executed, and the flow is returned.

It is noted that when the condition is not fulfilled in each step of the above flow, the flow proceeds to return and the flow from step S101 is executed. These processes are repeatedly executed at a predetermined interval by the engine ECU 5.

When conditions are fulfilled in all steps, the engine stop control execution flag F_FCMG is set to "1" and the idle stop is executed.

Next, a flow for estimating the catalyst temperature of the three way catalyst 15 according to the present embodiment will be described with reference to FIG. 3. This flow is carried out by the ECU 5, similar to the flow for determining the idle execution determination.

First, it is determined at step S1 whether the engine is in the starting mode. If the engine is in the starting mode, the catalyst temperature determination flag FCATWOT is set to "1" at step S2, followed by terminating the present routine.

On the other hand, if the engine 1 is not in the starting mode, it is determined at step S3 whether or not a fail-safe action for a sensor (e.g. abnormality of the PBA sensor 8 and/or the CRK sensor 11) has been detected. If any fail-safe action has been detected, estimation of the catalyst temperature is difficult to carry out, and therefore the program proceeds to the step S2, wherein the catalyst temperature determination flag FCATWOT is set to "1", followed by terminating the present routine.

Figure 3:
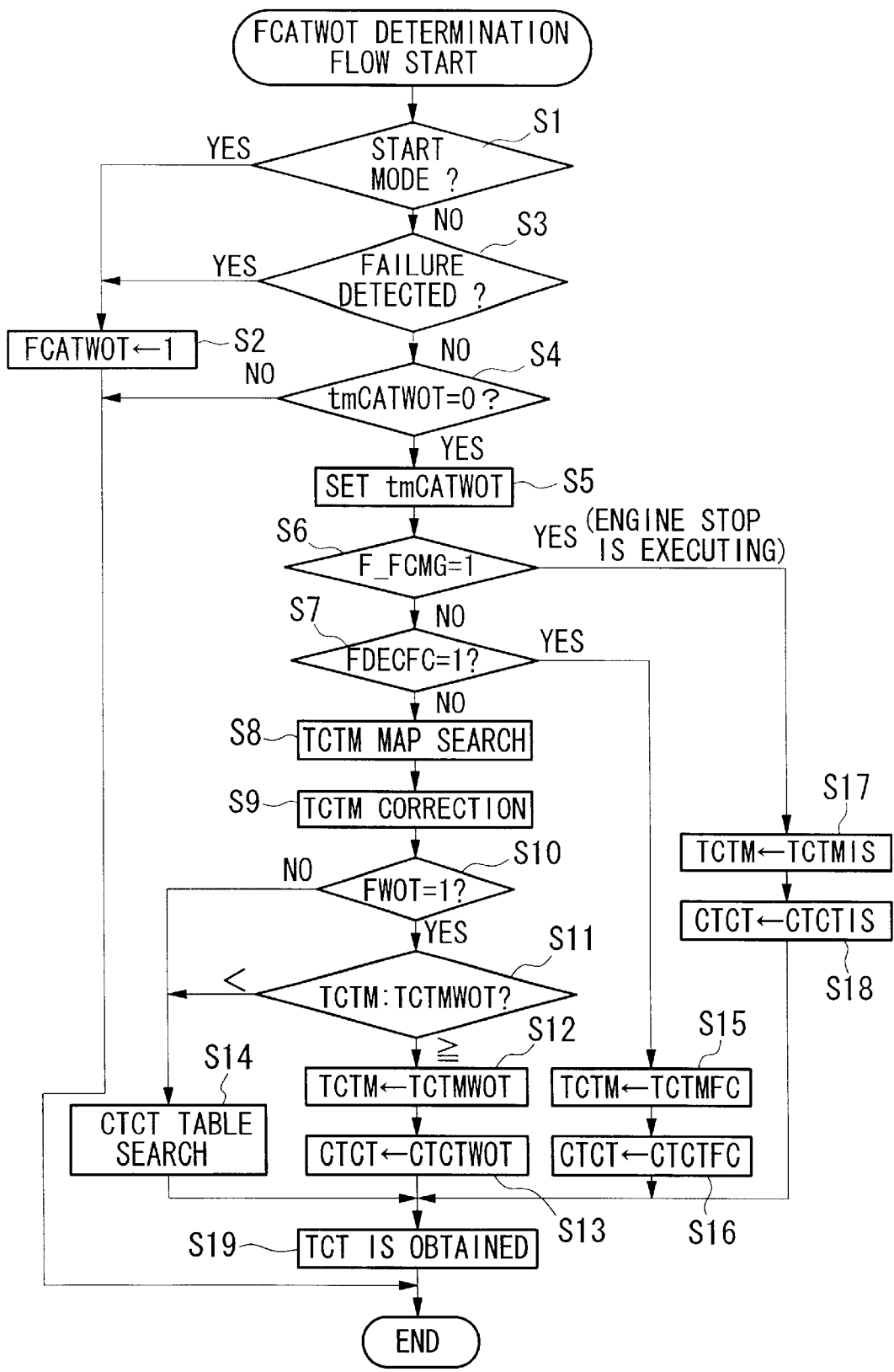
FIG. 3 is a flow-chart showing the catalyst temperature estimation flow according to the embodiment of the present invention.

The present process of FIG. 3 is executed at predetermined time intervals (e.g. 0.5 sec) and therefore it is determined at step S4 whether or not the count value of a down-counting timer tmCATWOT is equal to 0. The timer tmCATWOT is set to 0.5 sec as an initial value, and the count value of the timer tmCATWOT is subtracted from the initial value with the lapse of time. If the count value of the timer tmCATWOT is not equal to 0, the program is immediately terminated, whereas if the count value is equal to 0, the timer tmCATWOT is reset to the initial value (0.5 sec) at step S5.

Then, it is determined at step S6 whether or not an engine stop control execution flag F_FCMG (see FIG. 2) is "1", that is, whether or not the idle stop is being carried out If the engine stop control execution flag F_FCMG is not "1", indicating that the idle stop is not being carried out, the flow proceeds to step S7.

If the idle stop is being carried out, it is determined at step S7 whether or not the fuel cut flag FDECFC is set to "1", which, when set to "1", indicates that the fuel cut is being carried out during deceleration of the engine 1, assumes 1. If the fuel cut flag FDECFC is equal to 0, a TCTM map, shown in FIG. 4 is retrieved to determine a catalyst temperature map value TCTM according to the engine rotational speed NE and the intake pipe absolute pressure PBA at step S8.

Figure 4:
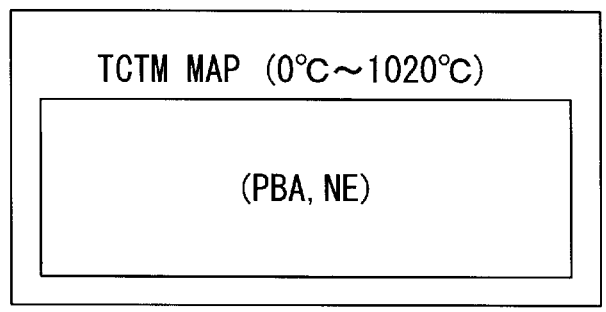
FIG. 4 is a diagram showing TCTM map which stores the catalyst temperature map values TCTM.

FIG. 4 shows the TCTM map as temperature value memory means in which values of the catalyst temperature map TCTM are set. The TCTM map is prepared by actually measuring the catalyst temperature ranging from 0° C. to 1020° C., assumed when the engine is actually operated with the engine rotational speed NE and the intake pipe absolute pressure PBA set to different values, to thereby set the measured values as the map values. In the present embodiment, the map values TCTM are each set to a value higher by a predetermined amount (e.g. 50° C.) than an actually measured value of the catalyst temperature at the same NE and PBA values.

Further, the catalyst temperature map value TCTM determined at step S8 may be corrected according to the atmospheric pressure PA, the intake sir temperature TA, the engine coolant temperature TW, and an ignition timing correction amount IGC at a step S9, by use of the following equation (2):

$$TCTM \leftarrow TCTM * KTCTPA \pm DTCTTA \pm DTCTIG \pm DTCTTW \quad (1)$$

where, KTCTPA represents an atmospheric pressure-dependent correction coefficient, DTCTTA an intake air temperature-dependent correction variable, DTCTIG an ignition time-dependent correction variable, and DTCTTW an engine coolant temperature-dependent correction variable, respectively.

Figure 5:
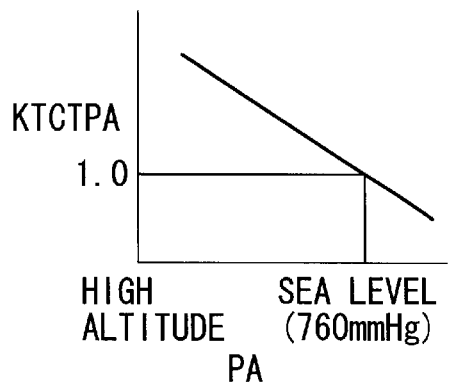
FIG. 5 is a graph showing the atmospheric pressure correction coefficient KTCTPA.

FIG. 5 shows a graph for determining the atmospheric pressure-dependent correction coefficient KTCTPA. As shown in FIG. 5, the correction coefficient KTCTPA is set to a smaller value as the atmospheric pressure PA is higher. For example, when the engine is operating at 0 m above the sea level, i.e. when the PA value assumes 760 mmHg, the KTCTPA value is set to 0.

Figure 6:
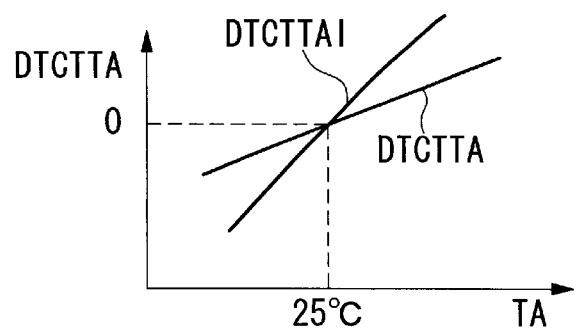
FIG. 6 is a graph showing the suction air temperature correction constant DTCTTA.

FIG. 6 shows a graph for determining the intake air temperature-dependent correction variable DTCTTA. As shown in FIG. 6, the correction variable DTCTTA is set to a larger value as the intake air temperature is higher. For example, when the TA value assumes 25° C., the DTCTTA value is set to 0.

Figure 7:
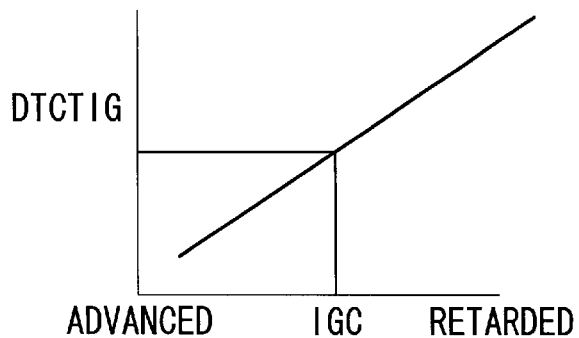
FIG. 7 is a graph showing the ignition timing correction constant DTCTIG.

FIG. 7 shows a graph for determining the ignition timing-dependent correction variable DTCTIG. As shown in FIG. 7, the correction variable DTCTIG is set to a larger value as the ignition timing correction amount IGC is set to a more retarding side. For example, when the ignition correction amount IGC is 0, the DTCTIG value is set to 0.

Figure 8:
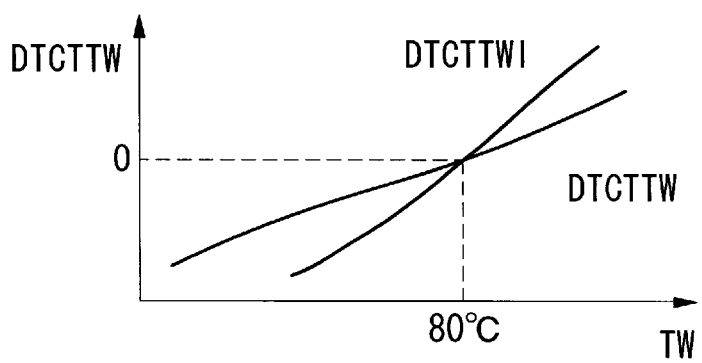
FIG. 8 is a graph showing the engine coolant temperature correction constants DTCTTW.

FIG. 8 shows a graph for determining the coolant temperature-dependent correction variable DTCTTW. As shown in FIG. 8, the correction variable DTCTTW is set to a larger value as the engine coolant temperature TW is higher. For example, when the TW value assumes 80° C., the DTCTTW is set to 0.

As shown above, when the catalyst temperature is corrected using respective correction variables in step S9, it is determined at the subsequent step S10 whether or not a high load determination flag FWOT which, when set to "1", indicates that the engine is in the high load condition (WOT condition) and hence execution of the fuel supply increase control is permitted, is set to "1". If the high load determination flag FWOT assumes "1", it is determined at step S11 whether or not the catalyst temperature map value TCTMWOT is equal to or higher than a predetermined value TCTMWOT e.g. 900° C.).

If TCTM≧TCTMWOT holds, the catalyst temperature map value TCTM is set to the predetermined value TCTMWT at step S12. In the subsequent step S13, a temperature-dependent correction coefficient CTCT is set to a predetermined value CTCTWOT (in the present embodiment, 0.06).

Figure 9:
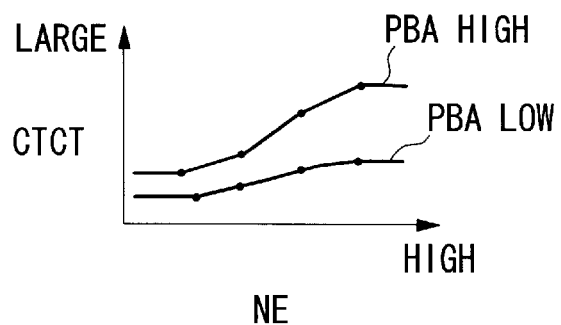
FIG. 9 is a CTCT table for determining a catalyst temperature-dependent correction coefficient CTCT.

On the other hand, if the high load determination flag FWOT is not equal to "1" at step S10, or if the catalyst temperature map value TCTM is lower than the predetermined value TCTMWOT, a CTCT table, shown in FIG. 9, is retrieved to thereby determine the temperature-dependent correction coefficient CTCT according to the engine rotational speed NE and the intake pipe absolute pressure PBA at step S14, and the flow proceeds to step S19.

As shown in FIG. 9, the CTCT graph is set such that the temperature-dependent correction coefficient CTCT is set to a larger value as the engine rotational speed NE is higher and/or the intake pipe absolute pressure PBA is higher.

On the other hand, if it is determined at step S7 that the fuel cut flag FDECFC which, when set to "1", indicates that fuel cut is being carried out during deceleration of the engine, is "1", the catalyst temperature map value TCTM is set to a predetermined value TCTMFC suitable for fuel cut (e.g. 600° C.), and at step S16, the temperature correction coefficient CTCT is set to the predetermined temperature correction coefficient CTCTFC (in the present embodiment, 0.004) and the flow proceeds to step S19.

On the other hand, if it is determined at step S6 that the value of the fuel stop control execution flag F_FCMG (see FIG. 2) is "1", that is, it is determined that the fuel cut is being carried out, the flow proceeds to step S17, wherein the catalyst temperature map value TCTM is set to a value TCTMIS (in the present embodiment, 650° C.), which is set to a value higher than the predetermined value at the time of fuel cut TCTMFC (in the present embodiment 600° C.). In the subsequent step S18, a predetermined temperature correction coefficient CTCTIS (in this embodiment, 0.002) employed during the idle stop operation is set, which is a value smaller than the predetermined temperature correction coefficient CTCTFC (in this embodiment, 0.004) employed during the fuel cut operation, and the flow proceeds to step S19.

It is noted that the predetermined temperature TCTMIS employed during the idle stop operation and the predetermined temperature correction coefficient CTCTIS employed during the idle stop operation correspond to predetermined values for stopping the internal combustion engine. In addition, the reason for setting the predetermined temperature TCTMIS during the idle stop operation to a larger value than the predetermined temperature TCTMFC during the fuel cut operation and the reason for setting the predetermined temperature correction coefficient CTCTIS during the idle stop operation to a smaller value than the predetermined temperature correction factor CTCMFC during the fuel cut operation are based on the fact that the temperature of the three way catalyst decreases rapidly during the fuel cut operation due to the air flowing through the three way catalyst, whereas, during the idle stop operation, the temperature of the three way catalyst decreases gradually because there is no air stream flowing through the three way catalyst.

Then, at step S19, the estimated catalyst temperature TCT is calculated based on the catalyst temperature map value TCTM and the temperature-dependent correction coefficient CTCT determined as described above in response to each driving condition by use of the following equation (2), $$TCT(n)=TCT(n-1)+(TCTM-TCT(n-1))*CTCT \quad (2)$$

where, n represents the present value of the estimated catalyst temperature TCT, and n−1 represents the last value of the TCT value. Further, the initial value TCTM of the TCT is set to 200° C., when the coolant temperature TW is equal to or below 50° C., while it is set to 500° C. when the coolant temperature TW is higher than 50° C.

Further, the initial value TCTI is corrected according to a coolant temperature initial value-dependent correction variable DTCTTWI shown in FIG. 8 and an intake air temperature initial value-dependent correction variable DTCTTAI shown in FIG. 6 by use of the following equation.

$$TCTI \leftarrow TCTI \pm DTCTTAI \pm DTCTTWI \quad (3)$$

A series of the estimated catalyst temperatures are accurately calculated based on parameters depending on various driving conditions by repeating execution of the above-described series of processing.

The estimated catalyst temperature is used as parameters to determine the timing for increasing fuel at the time when a high load is imposed on the internal combustion engine 1 and to determine the increasing fuel amount for increasing fuel.

Regarding a detection of deterioration of the three way catalyst, it is necessary to detect when the catalyst is in the active state. Accordingly, deterioration of the three way catalyst is usually detected using the estimated catalyst temperature obtained by the above-described process as a parameter.

What is claimed is:

1. A catalyst temperature estimating apparatus comprising:

a driving state detection device for detecting a driving state of an internal combustion engine;

a catalyst installed in the exhaust system of the internal combustion engine;

a temperature estimating device for estimating a temperature of the catalyst based on the output of the driving state detecting device; and a determination device for determining whether the internal combustion engine is operating or stopping;

wherein the temperature estimating device estimates the temperature of the catalyst based on predetermined values used at the time of the engine stop when it is determined by the determination device that the internal combustion engine is stopped.

2. A catalyst temperature estimating apparatus according to claim 1, wherein said internal combustion engine is capable of executing an idle stop.

* * * * *